(12) United States Patent
Kaita et al.

(10) Patent No.: US 9,272,613 B2
(45) Date of Patent: Mar. 1, 2016

(54) STRADDLE TYPE VEHICLE

(71) Applicant: HONDA MOTOR CO., LTD., Tokyo (JP)

(72) Inventors: Kihoko Kaita, Wako (JP); Atsushi Takasaki, Wako (JP); Yoji Suzuki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/224,168

(22) Filed: Mar. 25, 2014

(65) Prior Publication Data
US 2014/0291052 A1    Oct. 2, 2014

(30) Foreign Application Priority Data

Mar. 29, 2013 (JP) ................................. 2013-074832

(51) Int. Cl.
| | |
|---|---|
| *B60K 11/04* | (2006.01) |
| *B60K 11/08* | (2006.01) |
| *B60K 11/06* | (2006.01) |
| *F01P 11/10* | (2006.01) |

(52) U.S. Cl.
CPC ................ *B60K 11/08* (2013.01); *B60K 11/06* (2013.01); *B60K 11/04* (2013.01); *B60Y 2200/12* (2013.01); *F01P 11/10* (2013.01)

(58) Field of Classification Search
CPC .......... B60K 11/08; B60K 11/06; F01P 11/10
USPC ....................................................... 180/68.1
See application file for complete search history.

(56) References Cited

U.S. PATENT DOCUMENTS

| | | | | |
|---|---|---|---|---|
| 5,715,904 | A * | 2/1998 | Takahashi et al. ............ | 180/229 |
| 7,686,116 | B2 * | 3/2010 | Oohashi et al. ............... | 180/219 |
| 8,083,017 | B2 * | 12/2011 | Arimura ....................... | 180/219 |
| 8,783,399 | B2 * | 7/2014 | Maeda et al. ................ | 180/68.1 |
| 8,905,169 | B2 * | 12/2014 | Yama et al. .................. | 180/68.4 |
| 2003/0010558 | A1 * | 1/2003 | Buell et al. .................... | 180/229 |

FOREIGN PATENT DOCUMENTS

JP            3508949         3/2004

* cited by examiner

*Primary Examiner* — Joseph Rocca
*Assistant Examiner* — Marlon Arce
(74) *Attorney, Agent, or Firm* — Rankin, Hill & Clark LLP (57) ABSTRACT

An inner cowl and a radiator upper cowl surround a radiator cover. An air guide is provided inside a radiator. A first air duct sends traveling air flow to the radiator while a second air duct, spaced laterally inwardly from the radiator, bypasses the radiator and sends cool traveling air flowing toward a driver's legs via a slit provided in a rear radiator cover.

15 Claims, 7 Drawing Sheets

STRADDLE TYPE VEHICLE

BACKGROUND OF THE INVENTION

1. Field of the Invention

The present invention generally relates to straddle type vehicles such as motorcycles, and especially to vehicles having a radiator in which the effect on the driver by exhaust air flowing from the radiator is reduced.

2. Description of Related Art

A known straddle type vehicle has a radiator and a shroud covering the radiator. The shroud provides an air duct outside the radiator to increase ventilation quantity from the radiator body (See Japanese Patent No. 3508949).

In the above-mentioned cooling structure, a cooling air passage that bypasses the radiator is provided laterally outside the heated exhaust air flowing from the radiator. Accordingly, the relatively high temperature radiator exhaust air flow possibly hits the driver. Therefore, there is a need to prevent the radiator exhaust air flow from hitting the driver and to improve the comfort of the driver.

SUMMARY OF THE INVENTION

The present application is directed toward preventing heated radiator exhaust air flow from hitting the driver.

In accordance with the present invention, a straddle type vehicle includes front and rear wheels, an engine disposed between the front and rear wheels and supported on a vehicle frame, a radiator, and a cowl. The radiator is disposed on one of the vehicle side portions forward of the driver and serves to cool the engine. The cowl extends forward of the radiator and is provided with an outlet covering the radiator. The cowl introduces the traveling air flow into the radiator, and exhausts the heated radiator exhaust air flow to the outside of the vehicle at a location forward of the driver.

The cowl has an outlet for air flow such that a part of the introduced traveling air flow bypasses the radiator and is exhausted more to the inner side, in the width direction of the vehicle, than is the heated exhaust air flow from the radiator. Accordingly, the heated exhaust air flow from the radiator does not hit the driver, which increases the comfort of the driver. Moreover, the ventilation quantity of the radiator can be increased.

In further accordance with the present invention, an air guide is provided inside the cowl and sends the traveling air flow introduced by the cowl to a core portion of the radiator, and the outlet for the traveling air flow is provided at a location relatively behind the outlet for heated radiator exhaust air flow. Accordingly, the unheated cool traveling air flow is exhausted relatively more to the inner side in the width direction of the vehicle than is the exhaust air flow from the radiator and the outlet for unheated cool traveling air flow, which bypasses the radiator, is provided behind the outlet from the radiator for heated radiator exhaust air flow. Accordingly, even if the exhaust air flow from the radiator reaches the vicinity of the driver, the temperature around the driver can be lowered by the unheated bypass traveling air flow.

In further accordance with the present invention, the outlet has an opening shape in the radiator side modeled on the shape of the core portion of the radiator and extends in a duct-shape from the outside portion of the cowl to the vicinity of the core portion. The air guide has an opening shape in the radiator side modeled on the shape of the core portion, and extends in a duct-shape from the front of the cowl to the vicinity of the core portion. Accordingly, the air guide can increase the sealability of the radiator cooling air flow passage and the hot air and the cool air can be separated inside the cowl.

In further accordance with the present invention, the radiator is disposed along the side surface of the vehicle and is long in the longitudinal direction. The radiator has a side radiator form in which the traveling air flow from the front direction of the vehicle flows through the core portion of the radiator from the inside to the outside in the width direction of the vehicle. The cowl has a maximum width portion in the width direction of the vehicle. The maximum width portion is wider than the width of the radiator and continuously covers the front, upper and rear ends of the radiator. Accordingly, the hot exhaust air can flow in a direction laterally away from the vehicle. Moreover, the cowl can be expanded to the outside of the radiator and another air guide can be formed separately from the air duct guided by the air guide to the side radiator.

In further accordance with the present invention, the air guide has an electric cooling fan in the vicinity of the radiator core portion, and the electric cooling fan introduces the cooling air from the outside to the inside in the width direction of the vehicle. Accordingly, when the electric cooling fan is operated for cooling during stopping, the air guide exhausts the exhaust air flow from the radiator to the front direction of the vehicle, which can prevent the exhaust air flow from hitting the driver.

In further accordance with the present invention, the cowl has a projecting portion that projects to the outside in the width direction of the vehicle and extends vertically behind the radiator. A front surface of the projecting portion obliquely extends to the rear edge of the core portion, and a slit-shaped cool air flow outlet extends vertically and is provided on the outside of the rear surface in the width direction of the vehicle. Accordingly, the front surface of the projecting portion can guide the exhaust air flow from the radiator to the outer side in the width direction of the vehicle while the cool bypass air flows in the vicinity of the tip of the projecting portion so as not to introduce the exhaust air flow to the inner side.

In further accordance with the present invention, a rear surface of the projecting portion is behind the radiator, and the rear radiator cover is recessedly curved and vertically extended. Accordingly, if the driver's leg approaches to the cowl during driving, the cowl is configured so as to easily secure the passage and the outlet for the cool air. Simultaneously, the cowl hardly interferes with the leg. Moreover, even if the cowl interferes with the legs, the driver hardly feels uncomfortable because the legs touch the surface.

BRIEF DESCRIPTION OF THE DRAWINGS

These and further features of the invention will be apparent with the following description and drawings, wherein.

DETAILED DESCRIPTION OF THE INVENTION

Hereinafter, one embodiment of the present invention applied to a large-size motorcycle based on the drawings will be explained. Moreover, in the present application, the directions such as "front and rear", "right and left", "upper and lower" are based on the directions of the vehicle, respectively. Moreover, the width direction of the vehicle is same as the right and left direction. In addition, the present invention can be applied not only to the large-size motorcycle but also to motorcycles in various sizes and other straddle type vehicles.

Figure 1:
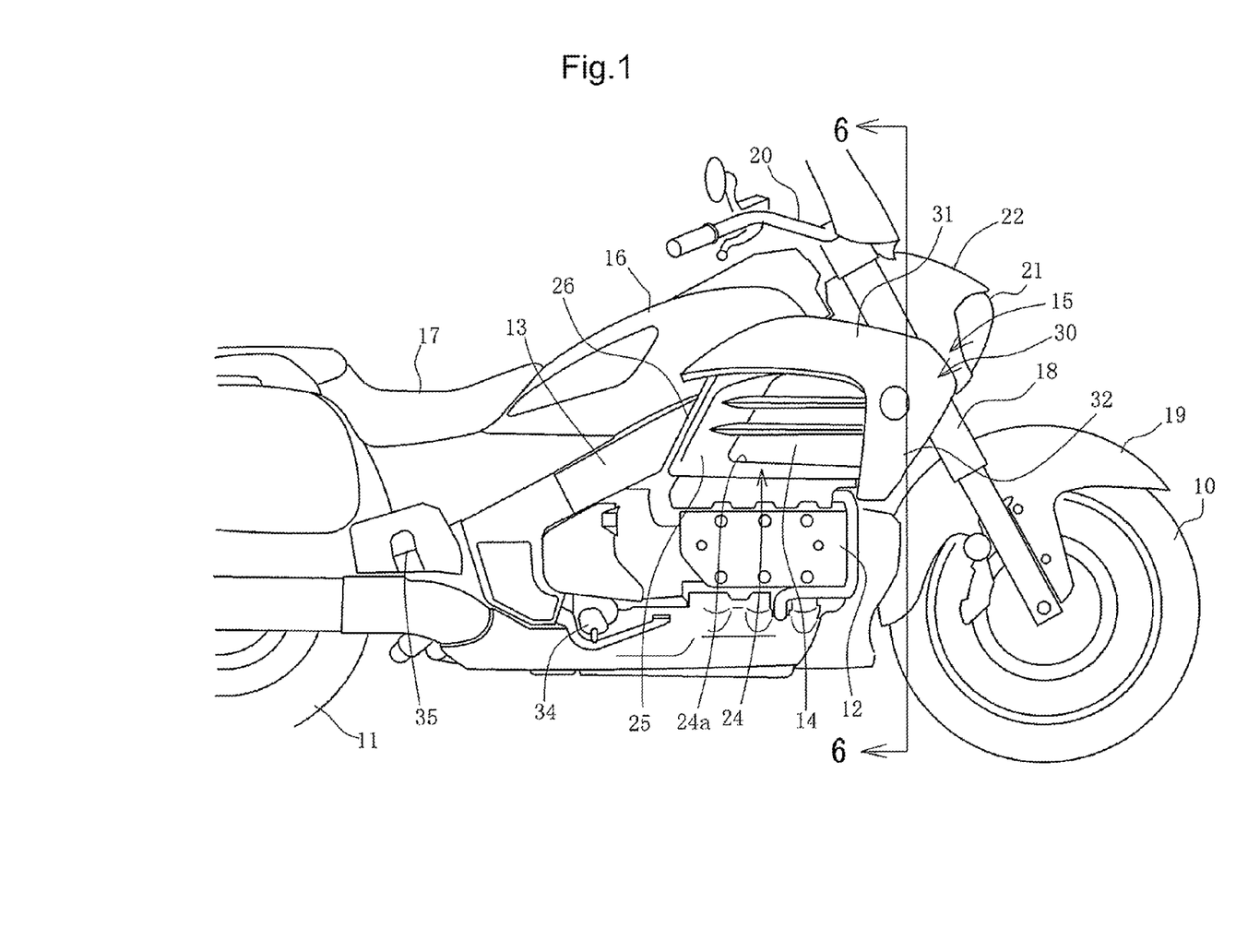
FIG. 1 is a partial right side view of a large-sized motorcycle related to the present application.
Figure 2:
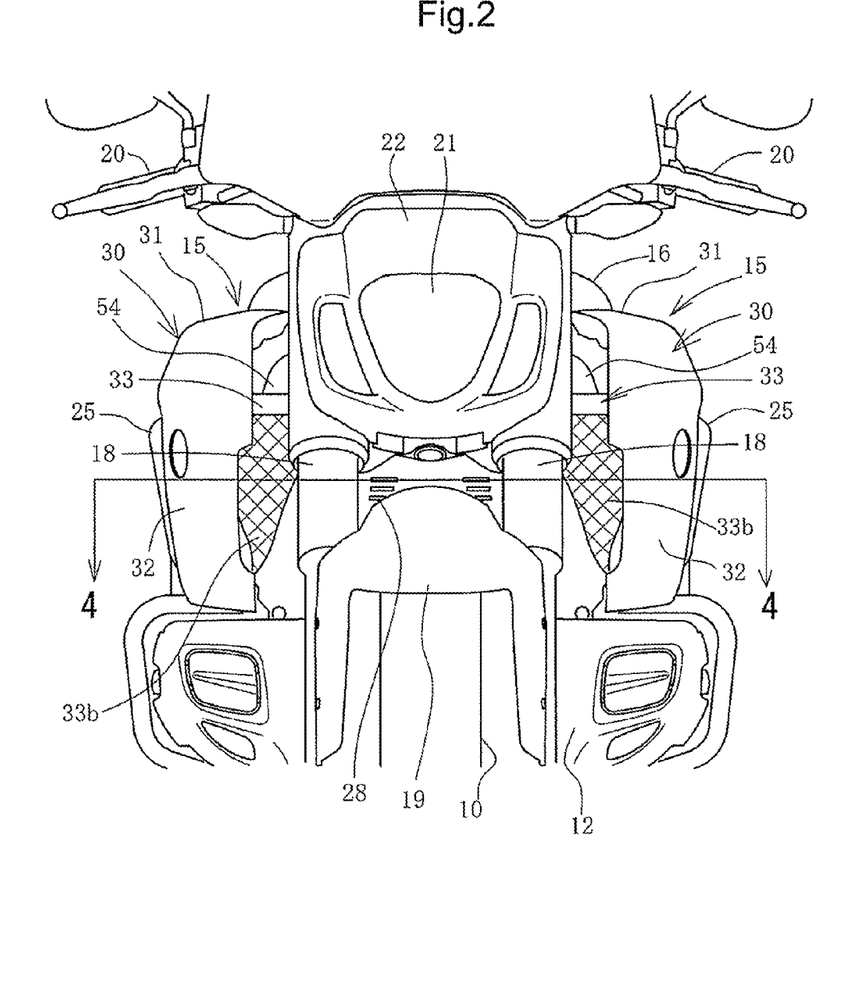
FIG. 2 is a partial front view of the above-mentioned vehicle.
Figure 3:
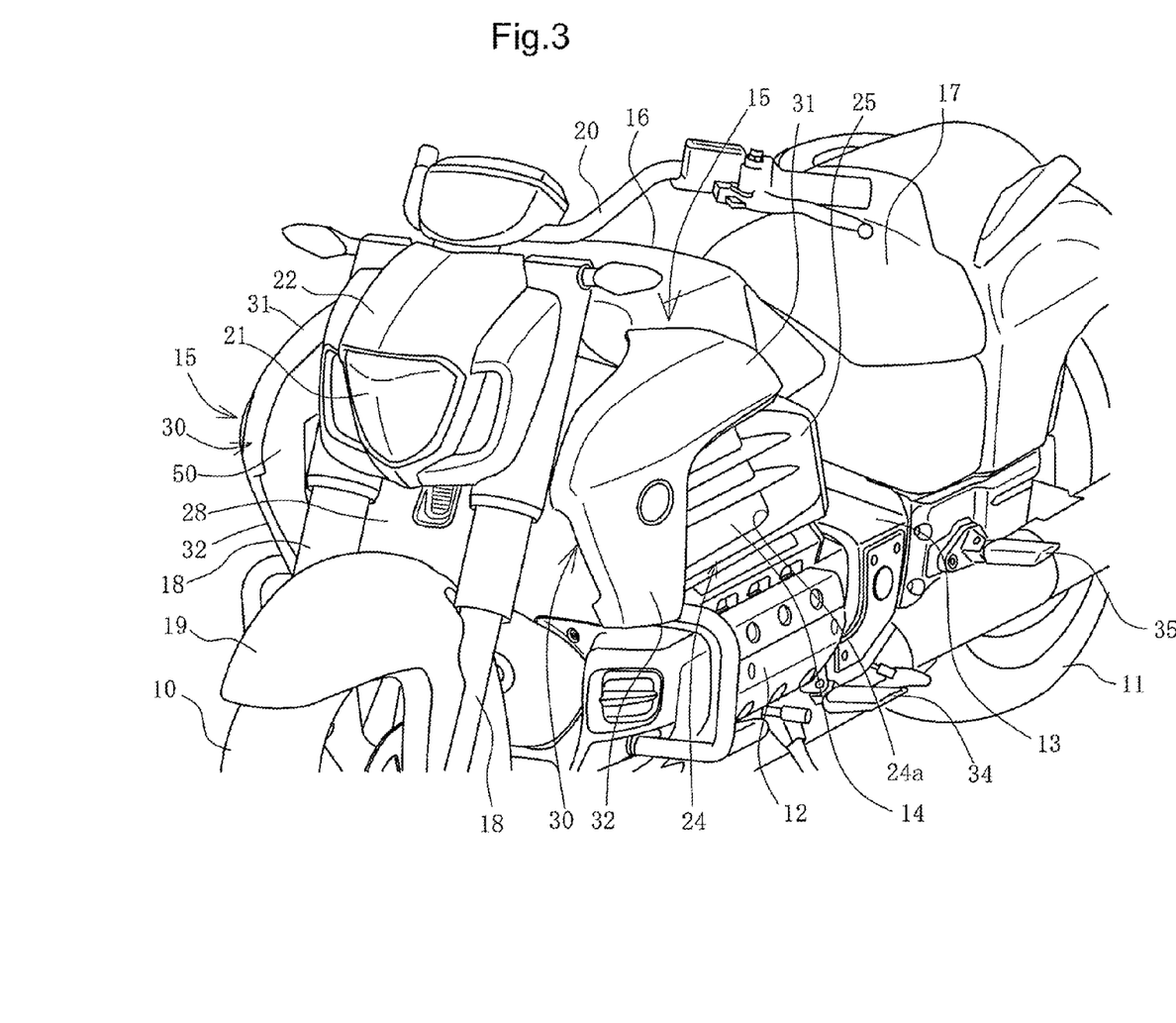
FIG. 3 is a perspective view showing the above-mentioned vehicle from obliquely leftward and frontward.

In FIGS. 1-3, a liquid cooling horizontally opposed engine 12 is disposed between a front wheel 10 and a rear wheel 11 and is supported on a vehicle frame 13. Right and left radiators 14 are disposed on the side portions of the vehicle above the engine 12 and forward of the driver. Each radiator 14 has a side radiator form in which the radiators are disposed on the right and left of the vehicle and respectively disposed toward the side directions of the vehicle. A cover 15 covers the radiator 14. The radiator cover 15 extends to the front or forward direction of the radiator 14, introduces a traveling wind or air flow into the radiator 14, and corresponds to the cowl in the present application.

A fuel tank 16 is disposed above the engine 12 and the radiators 14. A seat 17 is disposed behind the fuel tank 16. The fuel tank 16 and the seat 17 are both supported on the vehicle frame 13.

The front wheel 10 is supported between the lower end portions of right and left front forks 18. The upper portion of the front wheel 10 is rotatably supported on a head pipe (not shown) provided on the front end portion of the vehicle frame 13, and is steered by a handle bar 20.

A head light 21 is supported on the upper portion of the front fork 18 relatively above the front wheel 10. A resin front cover 22 covers the periphery of the head light 21. A front fender 19 is disposed below the head light 21 and over a top of the front wheel 10.

An electric fan 23 (see FIG. 4) is disposed laterally inside relative to the radiator 14. A radiator side cover 24 covers the outside of the radiator. The rear portion of the radiator side cover 24 forms a projecting portion 25 that extends or projects laterally (in a side direction). A radiator rear cover 26 is provided rearwardly of the projecting portion 25, as illustrated.

The radiator rear cover 26 closes the rear end of the radiator side cover 24. The upper portion of the radiator rear cover 26 is connected to the rear end portion of the radiator cover 15.

The radiator rear cover 26, together with a plurality of other members, serve as outer members providing the outer appearance side of the radiator cover 15 and the inner members inside the radiator cover, which is hardly visible from the outside. The radiator rear cover 26 is configured as an outer member with the radiator side cover 24 and a radiator upper cowl 30 covering the radiator front and upper ends.

As shown in FIG. 2, a center cover 28, which serves as a part of the vehicle cover, covers the portion disposed between the right and left radiator covers 15 above the front portion of the engine 12. There is a space between the center cover 28 and the radiator upper cowl 30, and the space expands to the outer direction beyond the front fork 18 and communicates with a radiator inside space formed between vehicle side members (i.e., the radiator 14 and the vehicle frame 13). The space is configured as an open portion that opens to the front or forward direction and introduces the traveling air flow into the radiator inside space.

An air guide 33 for guiding the traveling air flow to the radiator is housed in the radiator inside space. An upper end of the space is closed by an upper portion 31 of the radiator upper cowl 30, which bends substantially horizontally to the inner side and closely contacts the side surface of the fuel tank 16 (FIG. 2). Moreover, a front portion 32 of the radiator upper cowl 30 bends downwardly from the front end portion of the upper portion 31 to the vicinity of the upper surface of the engine 12. The radiator upper cowl 30 is positioned above the engine 12, and is retracted or disposed more to the inner side than the maximum projecting portion of the cover 15, as shown in FIGS. 2 and 4.

A driver's step 34 is provided on the rear end lower portion of the engine 12 and in the vicinity of the lower end portion of the vehicle frame 13. A pillion step 35 for the pillion passenger is provided behind the driver's step. The driver puts his or her legs along a lower end portion of the vehicle frame 13 and behind the radiator rear cover 26, and puts his or her feet on the driver's step 34. Accordingly, it is required to prevent the legs and the feet from being hit by the radiator exhaust air flow, which reaches a relatively high temperature.

Figure 4:
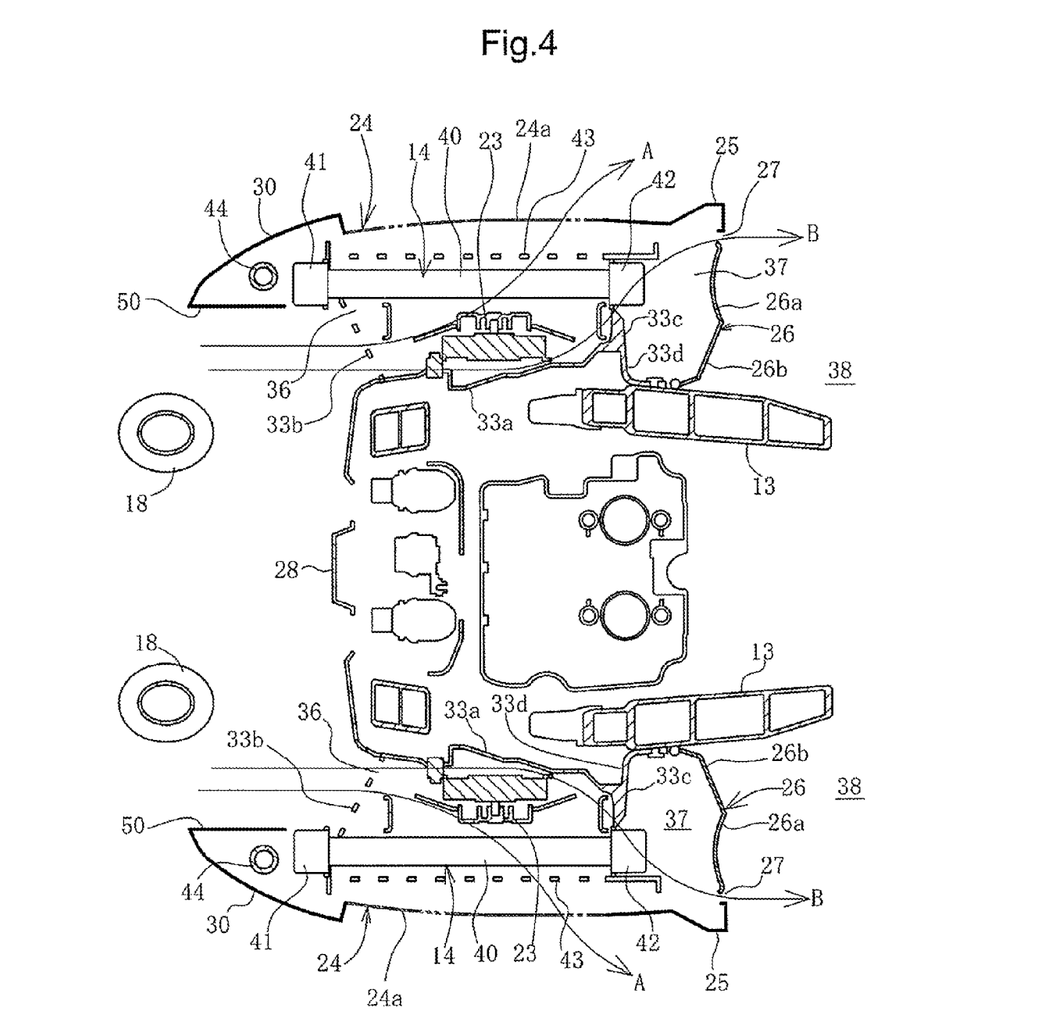
FIG. 4 is a sectional view taken along a 4-4 line in FIG. 2.

FIG. 4 is a sectional view taken along a 4-4 line in FIG. 2. The inside of the radiator 14 is configured as a first air duct 36 formed by the air guide 33. The air guide 33 has a duct-shape and extends from the front of the radiator cover 15 to a core portion 40 of the radiator 14. The air guide 33 defines a container-shaped recess facing to the inner direction of the vehicle and is simultaneously opened to the outer direction (i.e., toward the radiator core portion 40). The air guide shape, in side view, is modeled on the shape of the core portion 40 of the radiator 14, and has approximately the same shape. The periphery of the air guide 33 closely contacts the periphery of the radiator core portion 40.

The air guide 33 has an inner wall 33a and a bottom wall extending from the inner wall. The inner wall 33a faces the core portion 40, and is inclined such that the rear end of the inner wall gradually approaches the core portion 40. The bottom wall forms a flange-shape wall projecting to the radiator 14.

A front wall 33b, which is mesh-shaped, is provided as an inlet for the traveling air flow and is disposed between the radiator, near the front tank 41 thereof, and the connecting portion of the center cover 28. It is noted that the center cover 28 is configured such that the center thereof projects forwardly and the sides of the center cover have a rearwardly curved surface. Accordingly, the traveling air flow can be efficiently directed toward the front wall 33b.

A rear wall 33c is configured such that the tip thereof closely contacts the rear tank 42 of the radiator 14 and closes the rear side of the first air duct 36. A stay 33d, which integrally extends rearwardly, is provided on the rear wall 33c and is connected to the vehicle frame. As such, the air guide 33 is fixed to and supported by the vehicle frame 13.

The upper wall and the lower wall are not shown. However, the laterally outer edges of the upper and lower walls closely contact the radiator 14, and close the upper and lower ends of the first air duct 36, respectively. Accordingly, the air guide 33 is configured as an air guide (duct) to guide the traveling wind or air flow to the radiator core portion 40 such that the front wall 33b is an inlet for the traveling air flow and the open portion facing to the core portion 40 is an outlet for traveling air flow. As shown by an arrow A in FIG. 4, the traveling air flow is introduced from the front wall 33b and enters inside of the first air duct 36, and is guided by the inner wall 33a to the core portion 40, bends to the outer direction, and passes through the core portion 40. Accordingly, the traveling air flow can efficiently cool the radiator 14.

After passing through the core portion 40, the traveling air flow as a heated exhaust air flow passes through a mesh-shaped radiator grill 43 disposed laterally outside of the core portion 40. Moreover, the heated air flow is exhausted from an opening portion 24*a* of the radiator side cover 24 to the outside at a location forward of the driver. The opening portion 24*a* is configured as an outlet for the exhaust air flow from the radiator.

The rear portion of the radiator side cover 24 is configured as a projecting portion 25 projecting to the outer direction. Moreover, the projecting portion 25 is inclined forwardly toward the side of core portion 40. In other words, the projecting portion is sloped so as to open outwardly toward the rear. Accordingly, the heated exhaust air flow is guided by the slope of the projecting portion 25 and flows away from the projecting portion 25 in the outer direction and so as not to be introduced to the rear direction of the projecting portion 25.

The electric cooling fan 23 is disposed or housed inside the air guide 33. The electric cooling fan 23 is rotary driven only during stopping, and introduces air from the outside into the first air duct 36. The electric cooling fan 23 is operable to send air in a direction opposite to that shown by the arrow A so as to exhaust the air from the front wall 33*b* toward the front of the vehicle. Accordingly, cooling the engine during stopping is accomplished without sending the heated exhaust air flow toward the vicinity of the driver, which can increase the comfort of the driver.

The radiator rear cover 26 is attached behind the projecting portion 25 so as to close the rear of the radiator 14 and the air guide 33 and to form a second air duct 37. The radiator rear cover 26 is configured such that the laterally outside facing end thereof is connected to the projecting portion 25 and the laterally inside facing end thereof is attached to the vehicle frame 13. A slit 27 is formed in the rear cover 26 adjacent the projecting portion 25, that is, the position retracted more laterally to the inner side than the maximum projecting portion. The radiator rear cover 26 includes a recess portion 26*a* and a slope 26*b* that is inclined forwardly and forms a relatively wide space 38 for receipt of the driver's legs.

As described hereinafter, the second air duct 37 as a passage is separated from the first air duct 36 by the air guide 33, communicates with the space in front of the radiator 14, and is connected from the front portion 32 to the upper portion 31 of the radiator upper cowl 30, and moreover, to the radiator rear cover 26. Accordingly, as shown by an arrow B, a part of the traveling air flow passes more to the inner side of the vehicle than the radiator 14, enters the second air duct 37, and is exhausted rearwardly from the slit 27 to the driver's legs space 38. Accordingly, the cool traveling air flow can be sent to the driver's leg, which can increase the comfort of the driver. The slit 27 thus serves as an outlet of the second air duct 37.

At this time, the slit 27, which is an outlet for the traveling air flow passing through the second air duct 37 and bypassing the radiator 14, is provided laterally inwardly and rearwardly (in the rear direction and on an inner side) of the opening portion 24*a*, which is the outlet for the heated exhaust air flow from the radiator 14. Accordingly, the unheated cool traveling air flow is exhausted more to a laterally inner side, in the width direction of the vehicle, than is the exhaust air flow from the radiator 14.

The second air duct 37 is separated from the first air duct 36 and the air passes through the air guide 33 without passing through the core portion 40 of the radiator 14 (i.e., bypasses the radiator). Accordingly, the unheated cool traveling air flow can be provided to the driver's legs space 38.

In addition, the slit 27 is disposed more to the inner side of the vehicle than is the projecting portion 25. Accordingly, the exhaust air flow from the radiator can be prevented from detouring, and thereby can avoid an increase in temperature. Moreover, the projecting portion 25 has an inclined surface. Accordingly, the heated exhaust air flow is outwardly directed and flows away from the vehicle and is discouraged from detouring to the rear direction of the slit 27.

In addition, the slit 27, which is an outlet for the traveling air flow passing through the second air duct 37 and bypassing the radiator 14, is provided behind the outlet 24*a* for the heated exhaust air flow from the radiator. Accordingly, even if the exhaust air flow from the radiator reaches the vicinity of the driver, the temperature around the driver can be lowered by the unheated traveling air flow passing through the second air duct 37.

Moreover, the radiator side cover 24 is configured as a duct for the exhaust air flow from the radiator 14, and is extended in a duct-shape from the outside portion of the core portion 40. The open portion facing to the core portion 40 is configured as an inlet, and the outlet 24*a* for the exhaust air flow from the radiator is configured as an outlet. The radiator side cover 24 in itself is configured as an outlet for the exhaust air flow from the radiator 14 in a broad sense, the outlet for the exhaust air flow 24*a* is an outlet in a narrow sense.

As the exhaust outlet in a broad sense, the shape of the radiator side cover 24 in the inlet side, which is the portion facing to the core portion 40, is modeled on the shape of the core portion 40 of the radiator 14, and is extended to the vicinity of the core portion 40.

Meanwhile, the air guide 33 has a duct-shape. The opening shape in the radiator side, which is the portion facing to the radiator 14, is modeled on the shape of the core portion 40, and is extended to the vicinity of the core portion 40, which can increase the sealability of the first air duct 36 by the air guide 33. Accordingly, the hot air and the cool air can be separated inside the radiator cover 15.

Moreover, the radiator upper cowl 30 and an inner cowl 50 cover the front of the radiator 14. A coolant hose 44 connected to the front tank 41 is housed in the space surrounded by the inner cowl 50 and the radiator upper cowl 30.

In addition, each radiator 14 has a side radiator form that is disposed or extends longitudinally along the side surface of the vehicle. The traveling air flow from the front of the vehicle flows through the core portion 40 of the radiator 14 from the inside to the outside in the width direction of the vehicle. Accordingly, the hot air can easily flow in a direction away from the vehicle.

Figure 5:
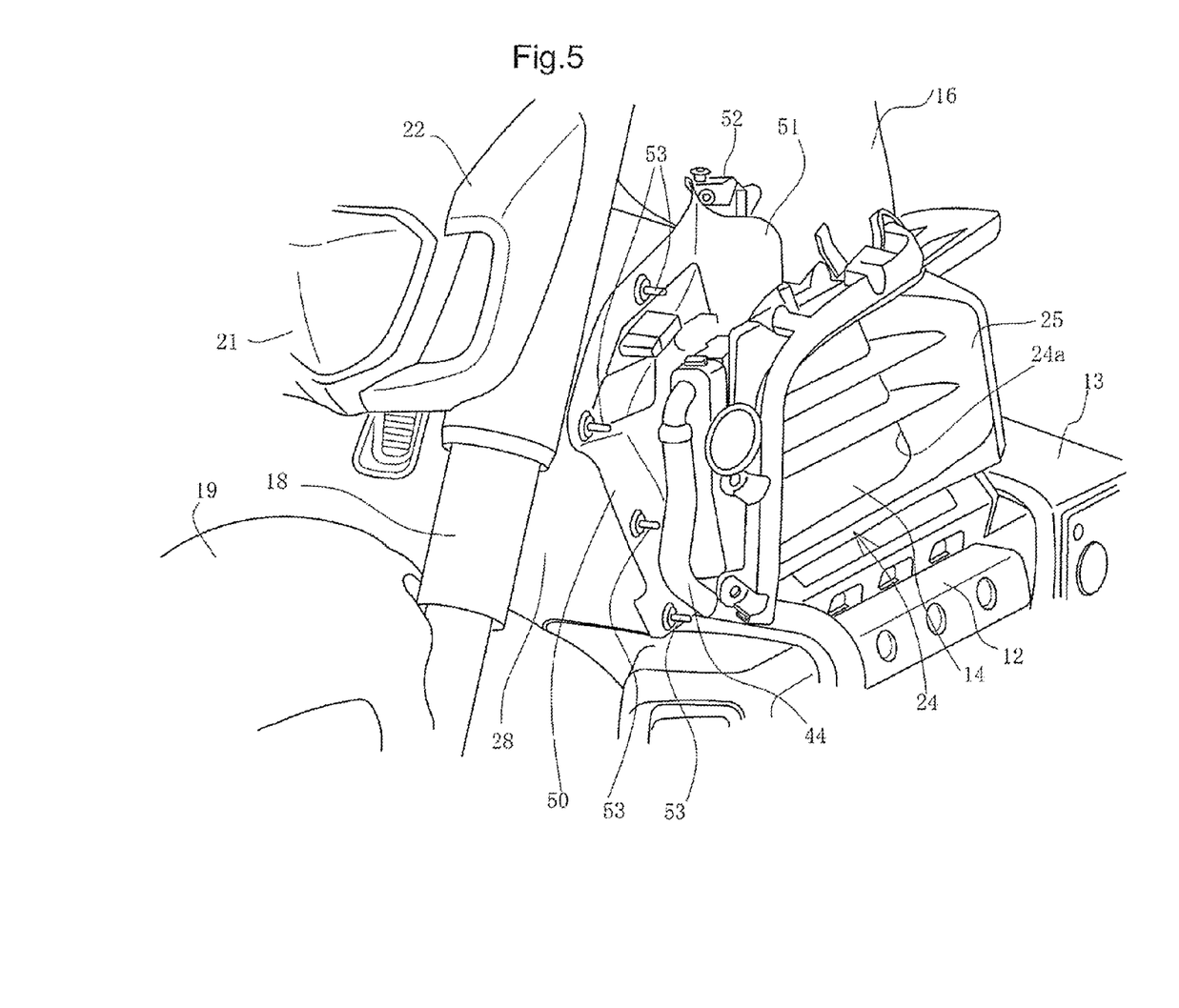
FIG. 5 is an enlarged perspective view showing a state detaching the upper cowl and the like in FIG. 3.

FIG. 5 is an enlarged perspective view showing a state detaching the radiator upper cowl 30 in FIG. 3. The inner cowl 50 is properly made of materials including resin and metal, and is provided from the side portion of the center cover 28 to the front side surface of the fuel tank 16. An upper portion 51 of the radiator upper cowl 30 is attached to a stay 52 provided on the side surface of the fuel tank 16. The lower portion of the radiator upper cowl is attached to the lower side surface of the center cover 28.

A connection member 53 detachably combines the periphery of the inner cowl 50 with the periphery of the radiator upper cowl 30. In addition, the radiator upper cowl 30 and a frame portion 24*b* of the radiator side cover 24 are detachably combined in a manner that is not shown in the drawings.

Figure 6:
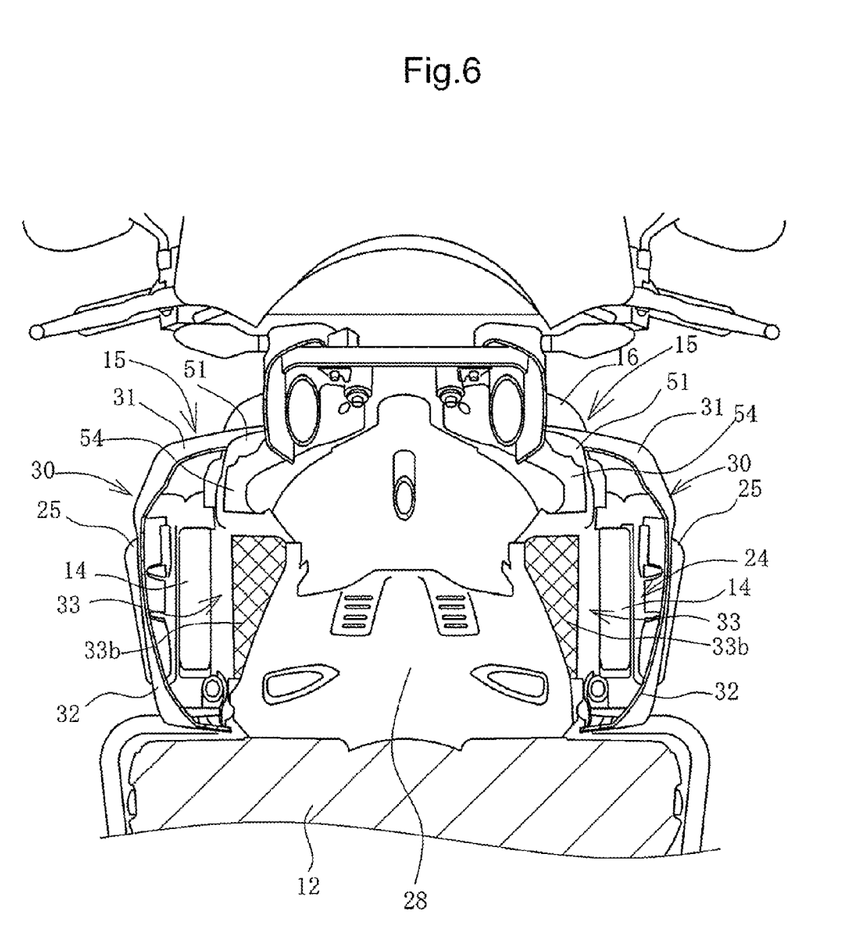
FIG. 6 is a sectional view taken along a 6-6 line in FIG. 1.

FIG. 6 is a sectional view taken along a 6-6 line in FIG. 1.

The front wall 33*b* of the air guide 33 is disposed between the center cover 28 and the radiator 14, and is opened toward the front.

The inner space of the front wall 33*b* surrounded by the air guide 33 is configured as the first air duct 36. Meanwhile, a space 54 is surrounded by the fuel tank 16, the upper portion 51 of the inner cowl 50, and the upper portion 31 of the radiator upper cowl 30. The space 54 serves as a part of the second air duct 37 above the air guide 33.

The radiator upper cowl 30 is connected to the front portion 32, the upper portion 31, and to the radiator rear cover 26. The radiator upper cowl 30 has a larger width, and extends laterally outwardly more than the radiator 14. Namely, as the maximum width portion of the radiator upper cowl 30 in the width direction of the vehicle is wider than the width of the radiator 14, the radiator upper cowl continuously covers the radiator from the front and upper ends of the radiator 14 to the radiator rear cover 26 in the rear direction. Therefore, the radiator upper cowl 30 is expanded laterally to the outside of the radiator 14. Accordingly, the space 54, which is extended laterally to the outside of the radiator 14, can form the second air duct 37 with sufficient capacity.

The space 54 is separated from the air guide 33, and is communicates cooling air flow longitudinally. The rear end of the space 54 is connected to the inner space of the radiator rear cover 26. Moreover, the upper portion 51 of the inner cowl 50 and the upper portion 31 of the radiator upper cowl 30 are jointly extended to the laterally inner side of the vehicle toward the fuel tank 16, which closes the space 54.

Figure 7:
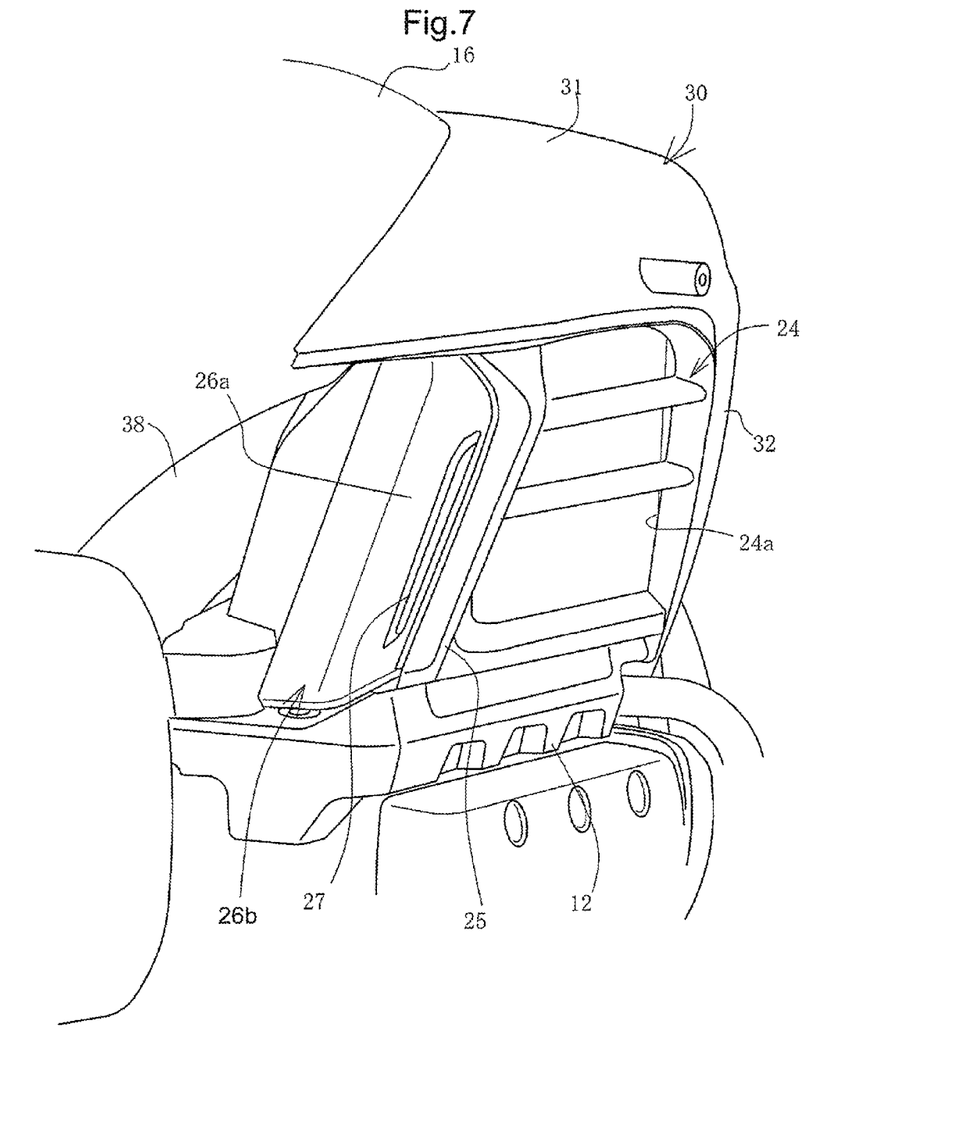
FIG. 7 is a perspective view showing the radiator rear cover looking forward from the rear of the vehicle.

FIG. 7 is a perspective view showing the radiator rear cover 26 from the rear. The slit 27 of the radiator rear cover 26 is formed vertically long. Accordingly, the driver's legs space 38 can be cooled vertically and widely.

In addition, the radiator rear cover 26 in an inclined state in which the whole of the radiator rear cover is inclined forward as it approaches the upper end. Accordingly, the degree of freedom to the driver's leg can be increased in this regard.

The upper portion 31 of the radiator upper cowl 30 extends from the front to the rear along the side surface of the fuel tank 16. Simultaneously, the rear of the radiator upper cowl is inclined downwardly. Accordingly, the radiator upper cowl can surround the inner space 54 (FIG. 6) of the upper portion 31.

In addition, the traveling air flow can be efficiently sent to the second air duct 37 which is an inside space of the radiator rear cover 26.

Moreover, the rear surface of the projecting portion 25 behind the radiator 14 is recessedly curved and vertically extended. Accordingly, if the driver's leg approaches to the cowl during driving, the cowl is configured so as to easily secure the passage and the outlet for the cool air. Simultaneously, the cowl hardly interferes with the leg. Moreover, even if the cowl interferes with the legs, the driver hardly feels uncomfortable because the legs touch the surface.

DESCRIPTION OF REFERENCE NUMBERS

12: engine, 13: vehicle frame, 14: radiator, 15: radiator cover, 16: fuel tank, 24: radiator side cover, 26: radiator rear cover, 27: slit, 28: center cover, 30: radiator upper cowl, 33: air guide, 50: inner cowl

What is claimed is:

1. A straddle type vehicle, said vehicle comprising:
   an engine disposed between a front wheel and a rear wheel and supported on a vehicle frame,
   a radiator disposed on at least one vehicle side portion in front of a driver and serving to cool the engine,
   a cowl covering the radiator, said cowl extending forward of the radiator and serving to introduce traveling air flow into said radiator, and serving to exhaust heated exhaust air flow from the radiator via an exhaust outlet laterally outside the vehicle at a location in front of the driver,
   wherein said cowl is configured such that a part of the introduced traveling air flow bypasses inwardly of the radiator in a vehicle width direction and is exhausted via a cool air flow outlet laterally inside, in the width direction of the vehicle, relative to the exhaust air flow from the radiator.

2. The straddle type vehicle according to claim 1, wherein an air guide is provided inside the cowl and sends the traveling air flow introduced by said cowl to a core portion of said radiator, and said cool air flow outlet for the traveling air flow bypassing the radiator is provided behind said exhaust outlet.

3. The straddle type of vehicle according to claim 2, wherein said exhaust outlet has an opening shape in the radiator side modeled on the shape of the core portion of said radiator and extends in a duct-shape from the outside portion of said cowl to the vicinity of said core portion,
   simultaneously said air guide has an opening shape in the radiator side modeled on the shape of said core portion and extends in a duct-shape from the front of said cowl to the vicinity of said core portion.

4. The straddle type vehicle according to claim 1, wherein said radiator is disposed longitudinally along the side surface of the vehicle and has a side radiator form in which the traveling air flow from the front of the vehicle flows through said core portion of the radiator from the inside to the outside in the width direction of the vehicle, and
   said cowl has a maximum width portion in the width direction of the vehicle, the maximum width portion is wider than a width of said radiator and continuously covers the radiator from the front, above and rear of said radiator.

5. The straddle type vehicle according to claim 1, wherein said cowl has a projecting portion that projects to the outside in the width direction of the vehicle and extends vertically behind said radiator, a front surface of the projecting portion obliquely extends toward a rear edge of said core portion, and said cool air flow outlet is a slit-shaped vertically extending cool air flow outlet provided on an outside of the rear surface in the width direction of the vehicle.

6. The straddle type vehicle according to claim 5, wherein a rear surface of the projecting portion is behind said radiator, and a rear radiator cover is recessedly curved and vertically extended.

7. The straddle type vehicle according to claim 2, wherein said radiator is disposed longitudinally along the side surface of the vehicle and has a side radiator form in which the traveling air flow from the front of the vehicle flows through said core portion of the radiator from the inside to the outside in the width direction of the vehicle, and
   said cowl has a maximum width portion in the width direction of the vehicle, the maximum width portion is wider than a width of said radiator and continuously covers the radiator from the front, above and rear of said radiator.

8. The straddle type vehicle according to claim 3, wherein said radiator is disposed longitudinally along the side surface of the vehicle and has a side radiator form in which the traveling air flow from the front of the vehicle flows through said core portion of the radiator from the inside to the outside in the width direction of the vehicle, and
   said cowl has a maximum width portion in the width direction of the vehicle, the maximum width portion is wider than a width of said radiator and continuously covers the radiator from the front, above and rear of said radiator.

9. The straddle type vehicle according to claim 2, wherein said air guide has an electric cooling fan in the vicinity of said core portion, and the electric cooling fan is operable to introduce the cooling air from the outside of the cowl to the inside of the cowl in the width direction of the vehicle.

10. The straddle type vehicle according to claim 3, wherein said air guide has an electric cooling fan in the vicinity of said core portion, and the electric cooling fan is operable to introduce the cooling air from the outside of the cowl to the inside of the cowl in the width direction of the vehicle.

11. The straddle type vehicle according to claim 4, wherein said air guide has an electric cooling fan in the vicinity of said core portion, and the electric cooling fan is operable to introduce the cooling air from the outside of the cowl to the inside of the cowl in the width direction of the vehicle.

12. The straddle type vehicle according to claim 2, wherein said cowl has a projecting portion which projects to the outside in the width direction of the vehicle vertically extends behind said radiator, the front surface of the projecting portion obliquely extends to the rear edge of said core portion, and said cool air flow outlet is a slit-shaped cool air flow outlet vertically extending provided on the outside of the rear surface in the width direction of the vehicle.

13. The straddle type vehicle according to claim 3, wherein said cowl has a projecting portion that projects to the outside in the width direction of the vehicle and extends vertically behind said radiator, a front surface of the projecting portion obliquely extends toward a rear edge of said core portion, and said cool air flow outlet is a slit-shaped vertically extending cool air flow outlet provided on an outside of the rear surface in the width direction of the vehicle.

14. The straddle type vehicle according to claim 4, wherein said cowl has a projecting portion that projects to the outside in the width direction of the vehicle and extends vertically behind said radiator, a front surface of the projecting portion obliquely extends toward a rear edge of said core portion, and said cool air flow outlet is a slit-shaped vertically extending cool air flow outlet provided on an outside of the rear surface in the width direction of the vehicle.

15. The straddle type vehicle according to claim 9, wherein said cowl has a projecting portion that projects to the outside in the width direction of the vehicle and extends vertically behind said radiator, a front surface of the projecting portion obliquely extends toward a rear edge of said core portion, and said cool air flow outlet is a slit-shaped vertically extending cool air flow outlet provided on an outside of the rear surface in the width direction of the vehicle.

* * * * *